(12) United States Patent  
Yang et al.

(10) Patent No.: US 8,020,144 B2
(45) Date of Patent: Sep. 13, 2011

(54) METADATA-BASED APPLICATION DEPLOYMENT

(75) Inventors: Xiaohong Mark Yang, Sammamish, WA (US); Randy Dong, Seattle, WA (US); Jeffrey Wang, Seattle, WA (US); Rou-Peng Huang, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/771,425

(22) Filed: Jun. 29, 2007

(65) Prior Publication Data

US 2009/0006409 A1 Jan. 1, 2009

(51) Int. Cl.
*G06F 9/44* (2006.01)

(52) U.S. Cl. ........ 717/106; 717/107; 717/109; 717/113; 717/114

(58) Field of Classification Search ................... 717/106
See application file for complete search history.

(56) References Cited

U.S. PATENT DOCUMENTS

| | | | |
|---|---|---|---|
| 5,548,754 A | 8/1996 | Pirahesh et al. | 1/1 |
| 5,590,324 A | 12/1996 | Leung et al. | 1/1 |
| 5,713,020 A | 1/1998 | Reiter et al. | 1/1 |
| 5,765,159 A | 6/1998 | Srinivasan | 707/102 |
| 5,875,333 A * | 2/1999 | Fish et al. | 717/109 |
| 6,170,009 B1 | 1/2001 | Mandal et al. | 709/223 |
| 6,192,357 B1 | 2/2001 | Krychniak | 1/1 |
| 6,370,681 B1 * | 4/2002 | Dellarocas et al. | 717/110 |
| 6,442,543 B1 | 8/2002 | Snodgrass et al. | 1/1 |
| 6,578,028 B2 | 6/2003 | Egilsson et al. | 1/1 |
| 6,601,233 B1 * | 7/2003 | Underwood | 717/102 |
| 6,629,094 B1 | 9/2003 | Colby et al. | 707/4 |
| 6,631,519 B1 * | 10/2003 | Nicholson et al. | 717/169 |
| 6,738,975 B1 | 5/2004 | Yee et al. | 719/310 |
| 6,876,314 B1 * | 4/2005 | Lin | 341/50 |
| 7,003,560 B1 | 2/2006 | Mullen et al. | |
| 7,047,249 B1 | 5/2006 | Vincent | 1/1 |
| 7,072,898 B2 | 7/2006 | Bussler et al. | |
| 7,080,092 B2 | 7/2006 | Upton | |
| 7,149,731 B2 | 12/2006 | Dettinger et al. | 1/1 |

(Continued)

FOREIGN PATENT DOCUMENTS

WO WO0246909 6/2002

OTHER PUBLICATIONS

IBM; "*Generate SQL queries based on DB2 Cube Views metadata*"; Jan. 26, 2006; http://www-128.ibm.com/developerworks/db2/library/techartcile/dm-0601dere/; 18 pgs.

(Continued)

*Primary Examiner* — Thomas K Pham
(74) *Attorney, Agent, or Firm* — Merchant & Gould

(57) ABSTRACT

Computer-implemented methods, computer-readable media, and an application system are disclosed for creating and deploying metadata-generated applications. Access is provided to one or more type libraries that each include one or more defined object types configurable for use in generating the application. The defined object types include data structure types, rule types, and data types. Input is elicited from a user regarding desired content and function of the application. Based on the user input, metadata is generated to adapt the defined object types to generate the application. Metadata is generated to adapt the defined data structure types to create one or more application databases, to adapt the defined rule types to create one or more application behaviors, and to adapt the defined data types to create one or more application data types.

20 Claims, 9 Drawing Sheets

U.S. PATENT DOCUMENTS

| | | | |
|---|---|---|---|
| 7,320,001 B1 | 1/2008 | Chen | 707/100 |
| 7,542,990 B2 | 6/2009 | Paval | 707/103 |
| 7,603,358 B1 | 10/2009 | Anderson | 707/10 |
| 7,702,622 B2 | 4/2010 | Li et al. | 707/3 |
| 2002/0026632 A1* | 2/2002 | Fuchs et al. | 717/137 |
| 2002/0199168 A1* | 12/2002 | Namito | 717/107 |
| 2003/0046061 A1* | 3/2003 | Preston et al. | 704/9 |
| 2003/0084423 A1* | 5/2003 | Clegg et al. | 717/105 |
| 2003/0149958 A1* | 8/2003 | Baluja et al. | 717/106 |
| 2003/0167455 A1* | 9/2003 | Iborra et al. | 717/105 |
| 2004/0015833 A1* | 1/2004 | Dellarocas et al. | 717/106 |
| 2004/0139061 A1 | 7/2004 | Colossi et al. | 707/3 |
| 2005/0010565 A1 | 1/2005 | Cushing et al. | 707/3 |
| 2005/0066306 A1 | 3/2005 | Diab | |
| 2005/0165826 A1 | 7/2005 | Ho et al. | |
| 2005/0192922 A1 | 9/2005 | Edlund et al. | 707/1 |
| 2005/0204340 A1 | 9/2005 | Ruminer et al. | 717/123 |
| 2005/0210004 A1 | 9/2005 | Focazio et al. | 1/1 |
| 2005/0251507 A1 | 11/2005 | Woollen | |
| 2006/0010058 A1 | 1/2006 | D'Hers et al. | 705/35 |
| 2006/0095435 A1 | 5/2006 | Johnson et al. | |
| 2006/0109800 A1 | 5/2006 | Vaillant et al. | |
| 2006/0143193 A1 | 6/2006 | Thakkar et al. | |
| 2006/0167868 A1 | 7/2006 | Zhang et al. | |
| 2006/0235837 A1 | 10/2006 | Chong et al. | 707/4 |
| 2007/0027904 A1 | 2/2007 | Chow et al. | 707/102 |
| 2007/0078826 A1 | 4/2007 | Bozkaya et al. | 707/3 |
| 2007/0256055 A1* | 11/2007 | Herscu | 717/115 |
| 2009/0006301 A1 | 1/2009 | Goetsch et al. | 706/47 |
| 2009/0006370 A1 | 1/2009 | Li et al. | 707/5 |

OTHER PUBLICATIONS

Microsoft; *Microsoft Office PerformancePoint Server 2007*; Nov. 15, 2006; http://download.microsoft.com/download/3/8/f/38f66127-43b2-47b9-9b5b-07dbd3f85d1c/Overview.pdf, 2 pgs.

Oracle; "*PeopleSoft Enterprise Architecture*", Mar. 2006;1 http://www.oracle.com/technology/products/applications/peoplesoft_ent/PeopleSoft_enterprise_arch.pdf, 15 pgs.

Stratecast; "*Data Migration: The Often Overlooked Critical Path to OSS/BSS Consolidation*"; Oct. 2006; http://www-03.ibm.com/industries/telecom/doc/content/bin/IBM_Data_Migration_WP_%20vfinal.pdfserver; 17 pgs.

U.S. Official Action dated Apr. 14, 2010 in U.S. Appl. No. 11/933,827.

U.S. Official Action dated Sep. 23, 2010 in U.S. Appl. No. 11/933,827.

* cited by examiner

METADATA-BASED APPLICATION DEPLOYMENT

BACKGROUND

Business intelligence applications desirably are deployed at various levels of an enterprise. At a local or regional office level, business applications may be directed to tracking data for specific customers, individual stores, or particular marketing personnel. On the other hand, headquarters-based applications may be directed to analysis of data summarizing data reported by the regions and/or local offices to analyze the data on an enterprise-wide level.

Adapting or scaling applications for use at multiple levels of an enterprise is a complicated task. Business applications used in local or regional offices may focus on daily or weekly details regarding individual customers, while applications at a headquarters level may focus on composite monthly or quarterly data for each of the regions. As a result, schemas used in defining databases for regional office applications will include different dimensions and members than those used in defining databases for the headquarters applications, as will the business rules used in manipulating the data stored in those databases.

Unfortunately, the schemas, business rules, and other attributes of applications usually are hard-coded specifically to the particular environments in which they are deployed, making it difficult to replicate the application at other levels or locations within the enterprise. At the very least, replication of applications may require significant technical and programming expertise to re-code or modify the schemas, business logic, and other attributes of applications so they can be used at other levels or in other departments of the enterprise. It would be desirable to be able to replicate and customize applications without having to rewrite or revise the hard-coded applications for each environment.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods, computer-readable media, and an application system for creating and deploying metadata-generated applications. In one implementation, access is provided to one or more type libraries that each include one or more defined object types configurable for use in generating the application. The defined object types include data structure types, rule types, and data types. Input is elicited from a user regarding desired content and function of the application. Based on the user input, metadata is generated to adapt the defined object types to generate the application. Metadata is generated to adapt the defined data structure types to create one or more application databases, to adapt the defined rule types to create one or more application behaviors, and to adapt the defined data types to create one or more application data types.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in the three-digit reference numerals refers to the figure in which the referenced element first appears.

DETAILED DESCRIPTION OF IMPLEMENTATIONS

This detailed description describes implementations of creating and deploying metadata-generated applications. Examples in the following disclosure describe the deployment and modification of applications at hierarchical levels within an enterprise. However, implementations of creating and deploying metadata-generated applications are not limited to such vertical scaling of applications. Implementations of metadata-based deployment also are usable in horizontally scaling applications to adapt them for use between different regions, as well as adapting applications for different types of businesses and business organizations. This application discloses methods, systems, and computer-readable media for deploying applications using adaptable metadata rather than hard-coding, and thus is not limited to a particular type or context of metadata-based application deployment.

Illustrative Operating Environment

Figure 1:
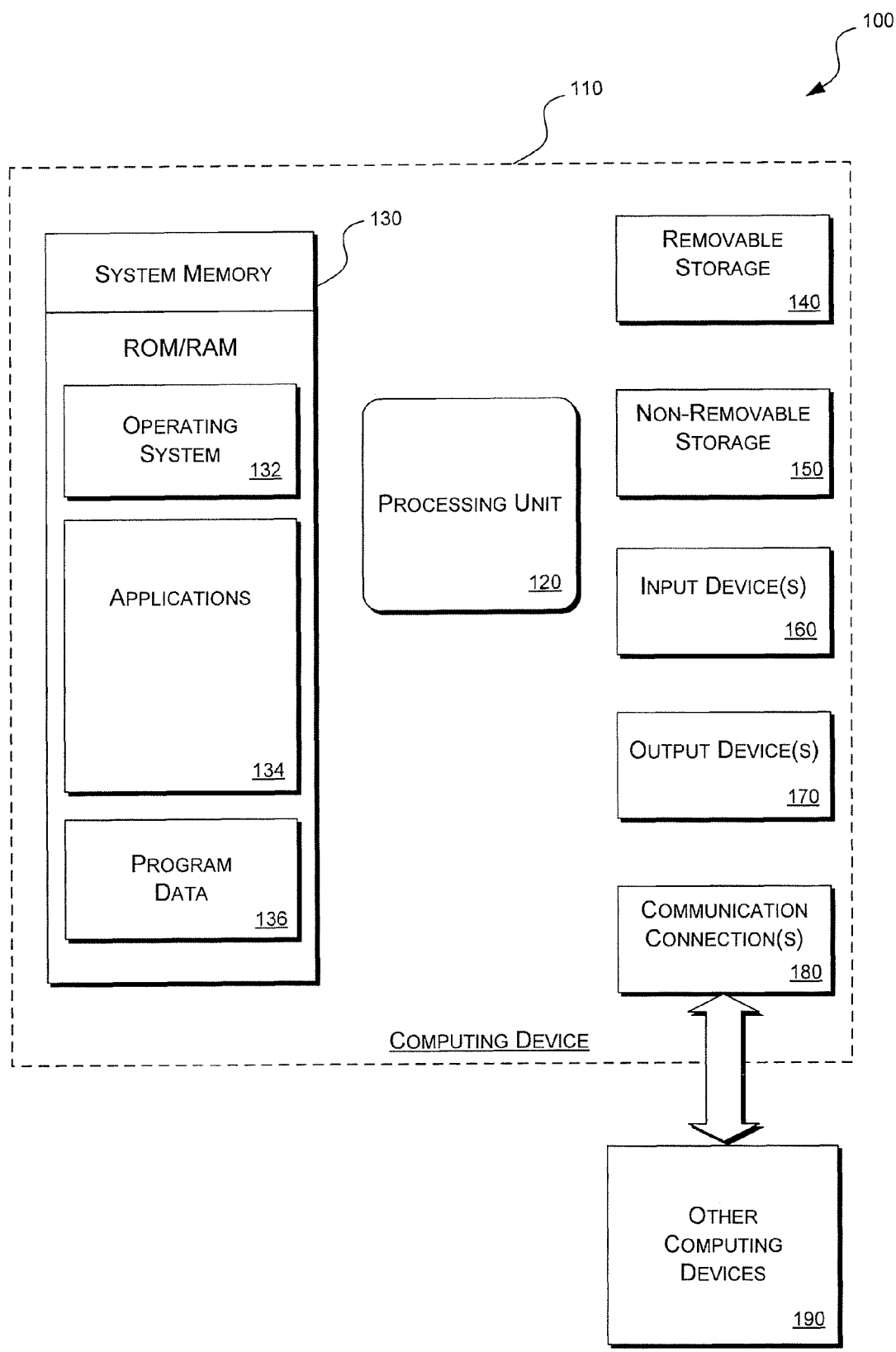
FIG. 1 is a block diagram of an operating environment for implementations of computer-implemented methods, computer-readable media, and systems as herein described.

Implementations of creating and deploying metadata-generated applications may be supported by a number of different computing environments on which software may be executed or tested. FIG. 1 is a block diagram of a representative operating environment 100.

Referring to FIG. 1, an exemplary operating environment 100 includes a computing device, such as computing device 110. In a basic configuration, the computing device 110 may include a stationary computing device or a mobile computing device. The computing device 110 typically includes at least one processing unit 120 and a system memory 130. Depending on the exact configuration and type of the computing device 110, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and nonvolatile, removable and non-removable media implemented in any method or technology for storage of information, such as computer readable instructions, data structures, program modules or other data. The system memory 130, the removable storage 140, and the non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also include one or more input devices 160 such as a keyboard, mouse, pen, voice input device, touch input device, etc. One or more output devices 170, such as a display, speakers, printer, etc., may also be included.

The computing device 110 also includes one or more communication connections 180 that allow the device to communicate with other computing devices 190, such as over a network or a wireless network. The one or more communication connections 180 represent an example of communications media. Communications media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Exemplary Environment for Metadata-Based Deployment of Applications

Figure 2:
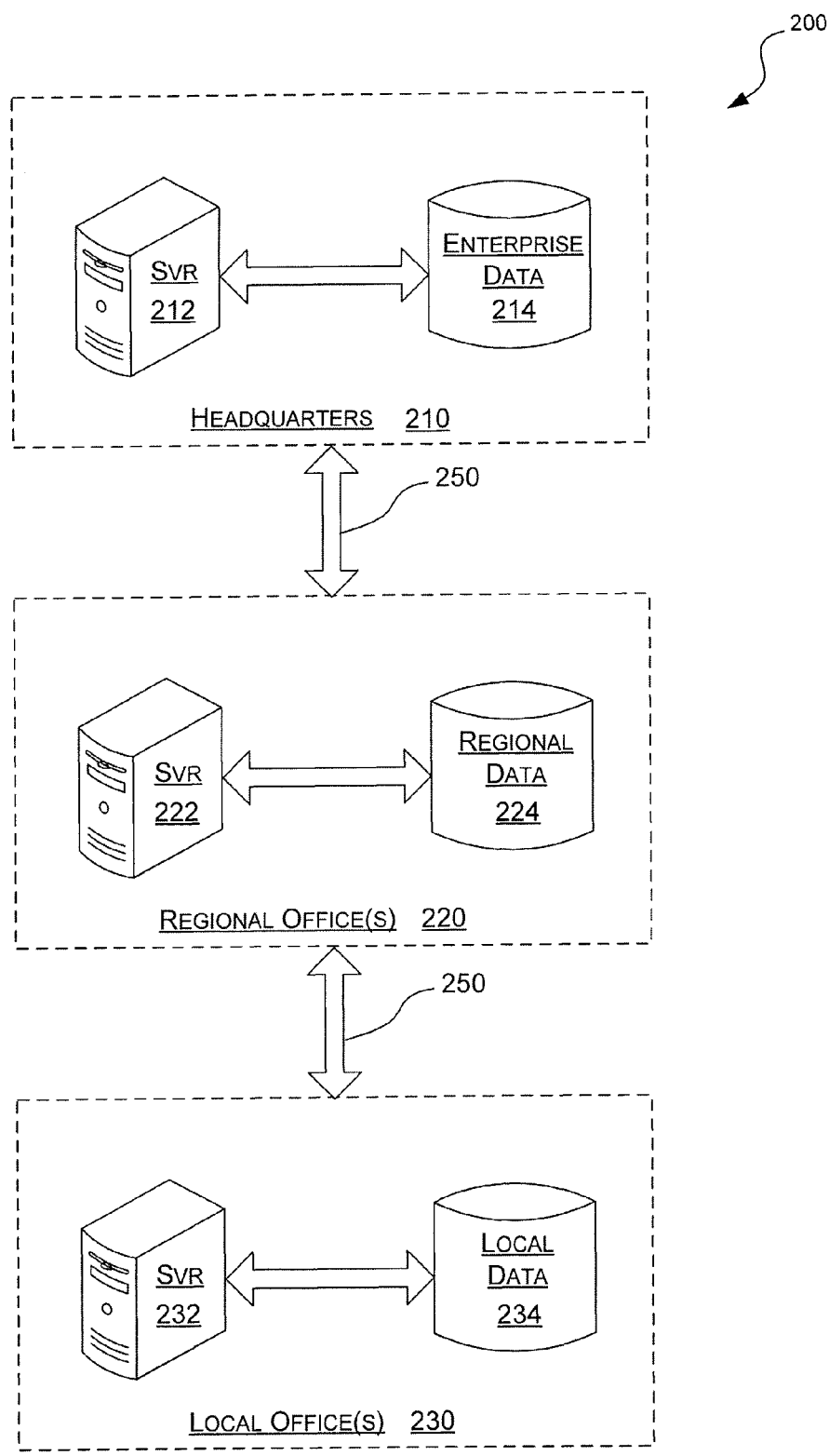
FIG. 2 is a block diagram of a hierarchy of application deployments within a hypothetical organization.

FIG. 2 illustrates an exemplary organizational environment 200 in which implementations of metadata-based application deployment may be used. As previously described, different levels or different divisions within an enterprise may desire business intelligence applications that present data of different levels of granularity in scope or time. For example, at a headquarters 210, a server 212 (or a group of many servers) operates on enterprise-wide data 214 to evaluate data compiled from all the regions (or divisions) within the organization. The enterprise data 214 may be collected over an enterprise network 250 from a plurality of regional offices 220 (one of which is shown in FIG. 2). As a result, for example, the headquarters server 212 may generate reports from the enterprise data 214 regarding quarterly revenue or profit data comparing each of the regions and for the enterprise as a whole. Thus, the enterprise data 214 may include a database schema in which each of the regional offices 220 are members.

For the regional offices, on the other hand, the regional server 222 operates on a regional level to evaluate regional data 224 which includes data collected over the enterprise network 250 from the local offices 230 (one of which is shown in FIG. 2). The regional server 222 operates on the regional data 224 to generate reports regarding monthly revenue and profit data. The local server 232 may generate reports from the local data 234 include data regarding the individual sales performance of particular sales people or sales information for particular products.

In one implementation, data is aggregated at each of the respective levels level to present data of a desired level of detail and over a desired time period. Thus, at the local offices 230, the local data 234 may be presented for individual sales persons and collected weekly, while at the regional offices 220, the regional data may collectively present data only for each individual local office 230 and collected monthly and the enterprise data 214 at the headquarters 210 may collectively present data for each of the regional offices 220 on a quarterly basis. This has advantages in that, at each of the respective levels, only a desired level of detail is presented while, at the same time, allowing some degree of privacy in its data at each of the levels.

To offer this type of differentiation, the respective databases at each of the levels will be defined by different schema and operate using different business rules to present desired decision support information. Also, the local offices 230 and regional offices 220 may use databases that are different from that of their peers. For example, if the enterprise sells clothing, each of the local offices 230 may carry different product lines than other local offices 230 that are situated in warmer and colder or dryer and wetter climates. Thus, the database schemas and business rules used by offices within each of the respective levels may differ from each other.

Using conventional application systems in which applications are hard-coded, or at least modified with hard code, implementing and maintaining applications in each of the offices and/or at each of the levels will involve the investment of significant technical resources. By contrast, using implementations of a metadata-based application deployment system, using implementations of metadata taxonomies, different applications and multi-level applications are generated by modifying metadata instead of by programming in hard code.

Framework for Metadata-Based Deployment of Applications

Figure 3:
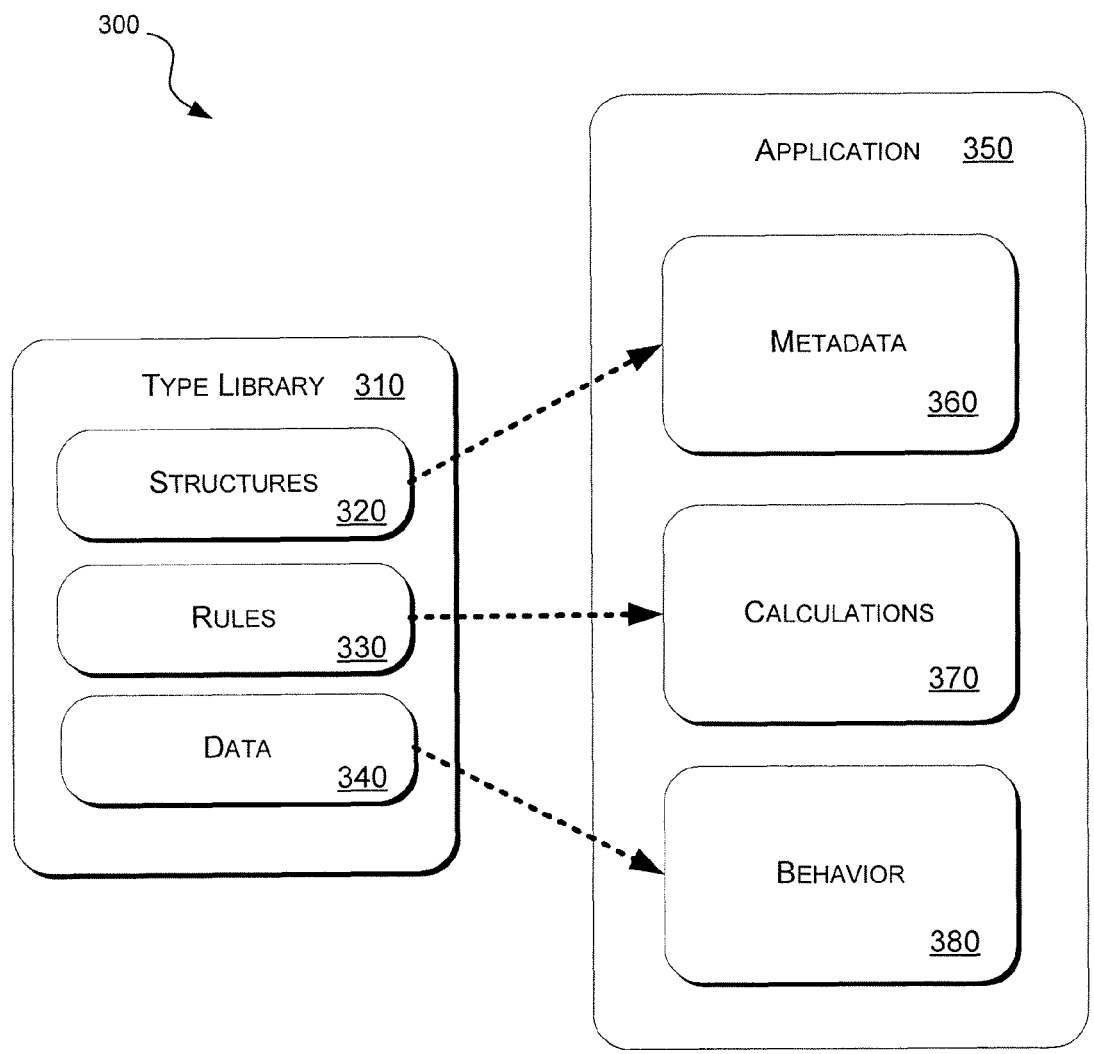
FIG. 3 is a block diagram of a type library used in an implementation of a metadata-based application deployment system.

FIG. 3 is a block diagram of a framework 300 used in an implementation of deploying a metadata-based application. In the framework 300, a type library 310 is provided. The type library 310 includes a plurality of modifiable components from which an application 350 is derived. The type library is described in commonly-owned and assigned U.S. Pat. No. 7,702,622, issue date Apr. 20, 2010, entitled "Advanced Techniques for SQL Generation of Performancepoint Business Rules". The contents of the commonly-owned patent, in its entirety, are incorporated by reference.

The type library 310 includes a plurality of modifiable components that are adaptable to desired specifications to generate the application. The components define data structures and operational behaviors to create an application capable of storing and processing data to produce a desired result. The types included in the type library 310 can be analogized to types used in programming languages in which designating a variable as being of a particular type, such as an integer type or a flow type, ascribes certain characteristics of that variable. In implementations of metadata-based application deployment, the types richly encapsulate all the potentially desired intelligent behaviors, structures, behaviors, or other attributes associated with the functions the types are created to support to simplify the process of generating an application from these types.

For illustration, types included in the type library 310 may include a time dimension type, which ascribes time-related attributes to that dimension. A time type thus may allow for tracking of quantities over a period of time, allowing for monitoring of changes of those quantities over time or aggregation of quantities that may include totals for longer periods of time or averaging quantities over selected periods of time. Alternatively, the type library 310 may include a member type that is configured to store and track information relating to individuals, where the type may include name and personal information fields, as well as quantitative fields for tracking metrics or other quantities that may be associated with an individual. Other types may include expense types, outside report types, year-end reporting types, etc., that involve certain formats and behaviors that are commonly used or even expected with regard to the specified type.

In one implementation of metadata-based application deployment, the type library 310 includes three types of components: structures 320, rules 330, and data 340. The structures 320 outline parameters describing generalized models and rules that provide a basis of an application. The structures 320 may include a relational database table, a multidimensional data cube, and other types of data structures that may be used by an application 350. Using selected elements included in the structures 320, the metadata 360 modifies general components defined within the structures 320 to provide the infrastructure of the application.

The rules 330 provide the basis for calculations 370 to be performed by the application. The rules 330, for example, may include a range of formulas that are used in business, such as present value calculations, exchange rate calculations, and other types of formulas. The rules 330 thus can be incorporated into the application 350 and modified to perform the calculations 370 to be performed by the application 350. The data 340 specifies the nature or parameters of information to be input to or generated by the application 350 to result in the behavior 380 of the application 350. Thus, in the example of a business application, the behavior 380 is the financial behavior of the application 350.

The framework 300 thus allows for the application 350 to be created without having to code the application 350 from "scratch." The metadata 360, calculations 370, and behavior 380 are adapted from selected components among the structures 320, rules, 330, and data 340, respectively, in the type library 310, to build the application 350. The components in the type library 310 are capable of being adapted to perform data processing operations desired by an enterprise.

In implementations of metadata-based application deployment, the types in the type library 310 may be stored in a metadata format, or stored in another format from which representative metadata is generated or extracted as appropriate in generating and deploying applications. Additional detail on the storage of types in the type library is included in the previously referenced patent application which has been incorporated by reference. Once the metadata representing the types is made available to the metadata-based application, the process by which they are adapted to create applications are both described further below with reference to FIG. 6.

Taxonomy for Metadata-Based Deployment of Applications

Figure 4:
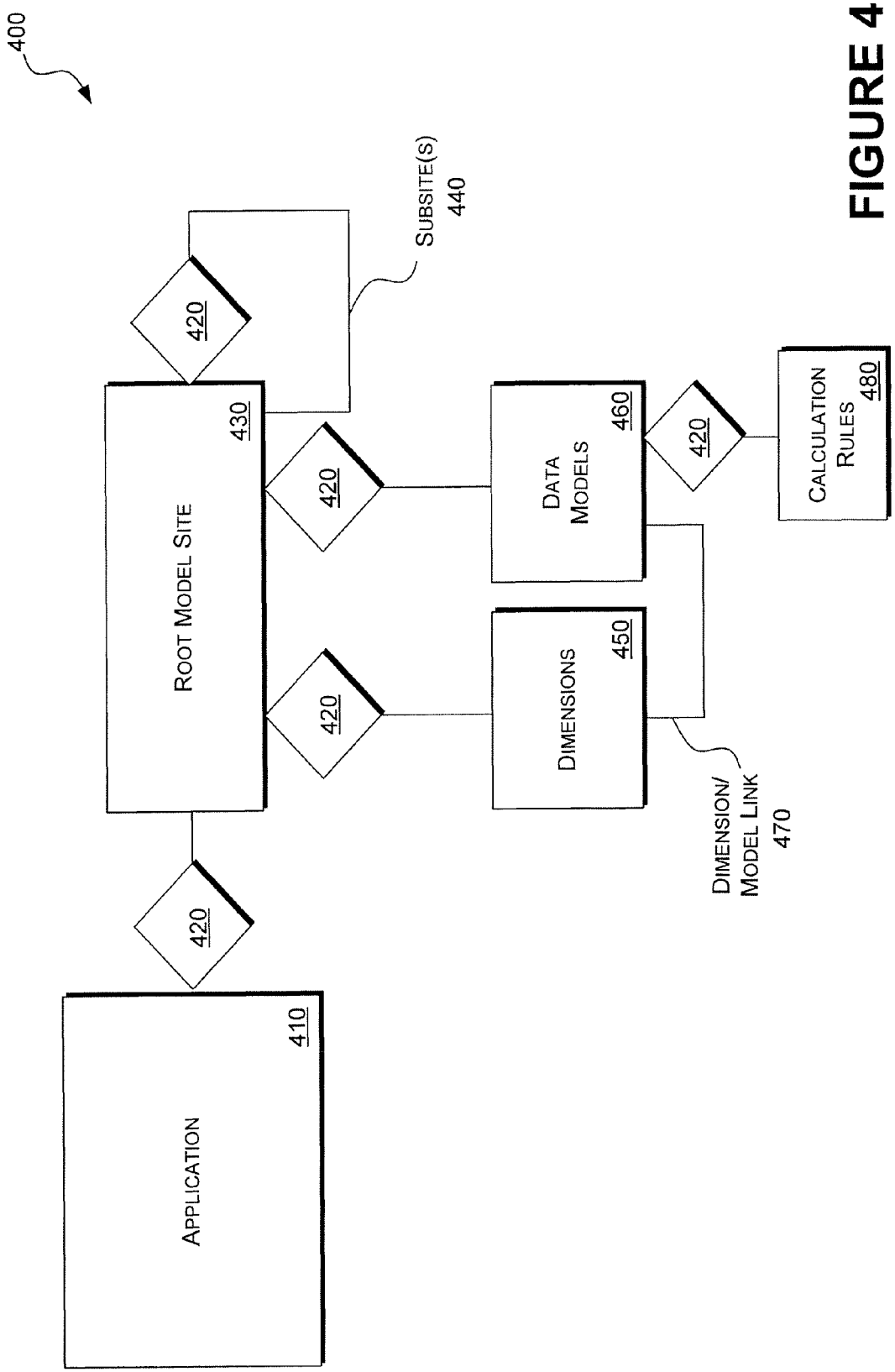
FIG. 4 is a block diagram of a taxonomy of a metadata-based application deployment system.
Figure 5:
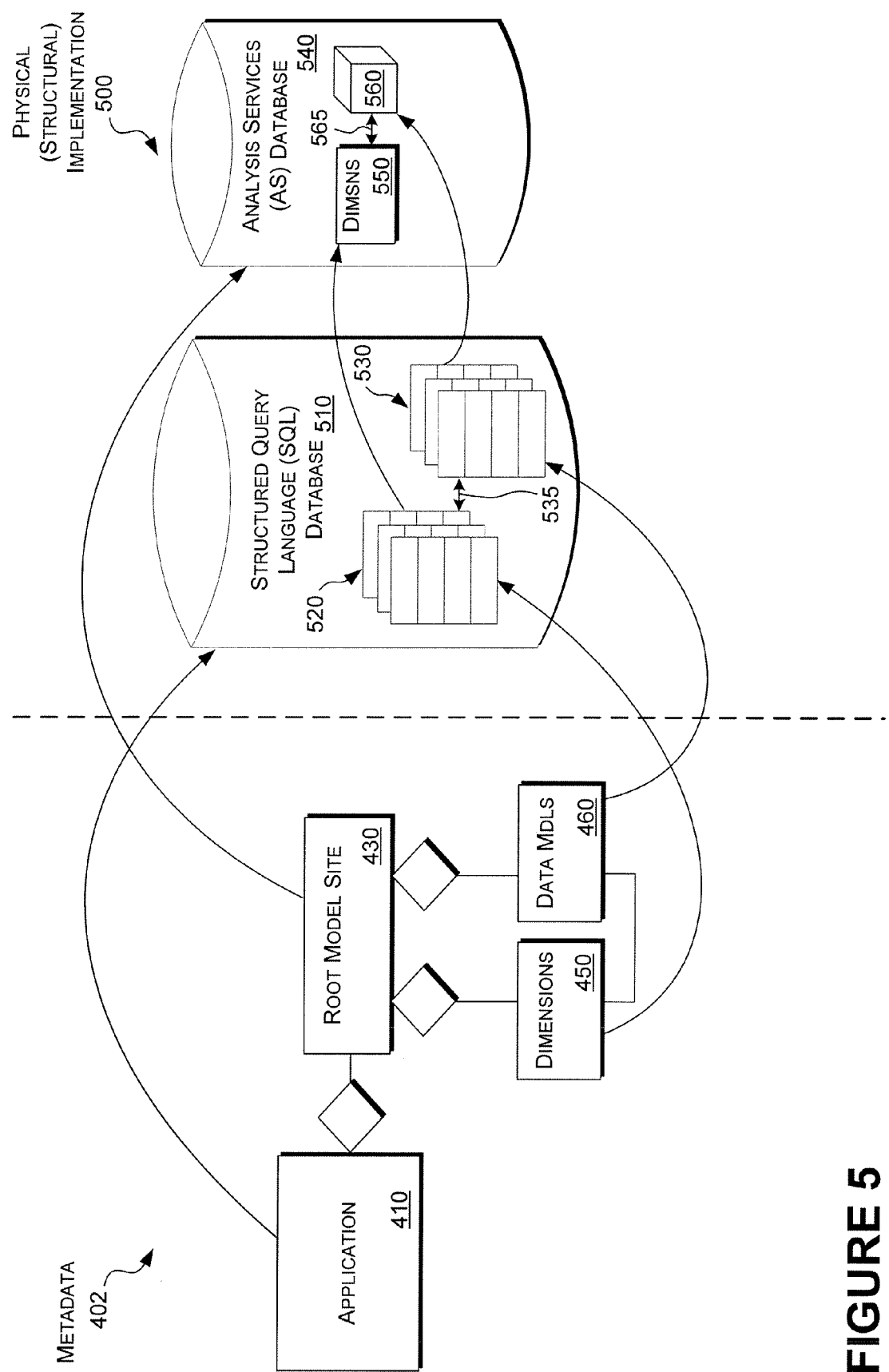
FIGS. 5 and 6 are block diagram illustrating physical implementation of a metadata-based application deployment system.

FIGS. 4 and 5 illustrate the basic structure of an implementation of a deployment of a metadata-based application in two different forms. FIG. 4 shows a unified modeling language (UML) representation 400 of one implementation of a metadata-based application deployment depicted using unified modeling language (UML). The representation 400 illustrates an implementation of rules that are used in deploying a metadata-based application for the sake of scalability and security, as will be explained further below.

The general repository of an implementation of the metadata-based deployment is an application 410. The application 410 is a repository of all of the metadata-modified structures, calculations, and behaviors generated for the application. In one implementation, it is desirable to replicate the application 410 and/or deploy the application and modify it for use in other domains, such as different levels within an enterprise or in other different contexts. The application 410 may be a large repository of content that could be difficult to scale and deploy across different servers or systems. To this end, the application 410, the repository of all the information previously described, can be partitioned or subdivided into smaller repositories of application content.

In one implementation, the application 410 includes or has (as indicated in FIG. 4 by the diamond symbols 420 commonly used in UML representations) a root model site 430. The root model site 430 is a basic model of the structures, calculations, behaviors, and other attributes of the application 410 that is deployable and replicable for use in other contexts. In other words, in the example of an application deployed at headquarters, regional office, and local office locations, the root model site 430 includes attributes from which applications will be deployed at each level in the form of a number of subsites 440 (represented in FIG. 4 by a UML loop 440 coupling the root model site 430 to itself). By creating or customizing an application by altering its metadata, rather than by hard-coding, application attributes encapsulated in the root model site 430 are much more easily adapted to the particular situation in which it will be used. Thus, for example, by adapting the metadata as applied to the root model site 430, the application 410 that was generated for the headquarters location can be adapted for use at the regional offices and/or the local offices, by changing the members of the databases, the calculations performed on the data, etc.

The root model site 430 in turn includes or has dimensions 450 and models 460. The dimensions 450 are, generally, database dimensions, each of which may include a list of members with which data would be associated. The models 460 represent the actual data structure in which the data will be stored within the specified dimensions 450. The dimensions 450 and models 460 are connected by a dimension/model link 470. The dimensions 450 specify the structure of the models 460, thus the link 470 is used to dictate the structure of the models 460. How the dimensions 450, models 460, and links 470 are drawn from a type library is explained further below.

For one example, if the application 410 is directed to calculating currency exchange, the root model site 430 would include dimensions 450 for time, exchange rates, and at least two types of currency. The time dimension would include years, quarters, months, or whatever units have been selected as the basic period for performing currency conversion. The exchange rates would include the prevailing exchange rates corresponding with the units of time specified in the time dimension. The currency type dimensions would include at least one dimension for a first type of currency from which a quantity of that currency is being converted and at least one additional dimension for a second type of currency to which the first type of currency is converted. Thus, in the case of the foregoing example, at least one model 460 used in the currency exchange database will include the quantity of currency of the first type held at a given point in time, the exchange rate between the first and second types of currency at that time, and, for the second type of currency, the converted quantity of currency.

The root model site 430 may include an unrestricted number of subsites 440. In addition, each site may have an unrestricted number of model sites for its applications. Thus, each site can have children, grandchildren, etc., that are predicated on and adapted from the model site. Each of the subsites receives or inherits the public metadata for the site or sites from which the subsite descends. The subsite receiving the metadata can extend or modify the inherited metadata, and/or add new metadata to tailor the function of the subsite 440 to suit the needs of the environment in which it is deployed.

As described with reference to FIGS. 5 and 6, model sites are implemented in physical form, in one implementation, to an SQL database and a multidimensional database. To this end, each of the model sites can be deployed to its own SQL and multidimensional databases. The generation of the separate databases helps to facilitate the proliferation of the metadata-based applications as described with reference to FIG. 2. The separate databases also support the autonomy of applications deployed at different levels, allowing for sites to have data that is not accessible by other applications in the hierarchy of applications and sites.

These foregoing types of metadata can be considered to be structural metadata. As described below, these types of metadata translate to various data objects or structures used in the deployment of the application. In addition, there also are other types of metadata, as suggested by the other types listed in the type library: the rules type 330 and the data type 340 (FIG. 3). The rules type is represented in the taxonomy 400 as calculation rules 480. The calculation rules 480, in one implementation of the metadata taxonomy, are considered to be an attribute of the data models 460. Because the calculation rules 480 describe operations to be performed on data within the models 460, the calculation rules 480 logically can be associated with the models 460. In addition to the previously described forms of metadata, which can be considered Within the metadata taxonomy, implementations of a metadata-based application deployment system include a number of different types of metadata. FIG. 4 expressly illustrates only a few of the types of metadata that may be included in implementations of metadata-based application deployment. The taxonomy 400 includes at least three types of structural metadata. The structural metadata, for example, may be applied to structures types 320 (FIG. 3) defined in the type library 310 to adapt structural components for use in a desired application. First, application and application model site metadata describes the overall form of the metadata as illustrated in FIG. 4. Second, dimension metadata is used, for example, to define member sets or member views to be used in the application. Third, model and model properties metadata defines the nature of the models and data structures to be used in deploying the application.

Fourth, in addition to the structural metadata, business rules and calculations metadata are used to describe the types of calculations to be applied to data stored in the models structures, as depicted by the calculation rules 480. The business rules and calculations metadata may be used, for example, to adapt rules types 320 (FIG. 3) from the type library 310 to define the calculations to be performed in the application.

Beyond metadata for tailoring structures or calculations, other types of metadata are used to delineate other operational aspects of a metadata-based application. Fifth, cycle, assignment, and jobs metadata is used to define operational aspects of the application. For example, this metadata defines how often available jobs are run to process the data and thus update the data stored in the application's data structures. Similarly, this metadata defines how often data is collected or retrieved from users or other data sources to support calculations on the data.

Sixth, user, role, and model permissions metadata are used to support application security. For example, this metadata can be used to determine which users can enter, modify, or read particular data. For example, the user, role, and model permissions data determines which users have only read access or have write access to change or add data. Also, this metadata determines which users have access to what data, such as whether a user can access data only at a particular level or whether the user also can access the data at the level of constituent subsites.

Seventh, metadata representing model-to-model associations allows different models to be linked. For example, if one model is used by an application for forecasting sales revenue, and another model is used for tracking sales revenue, the model-to-model associations metadata allows the models to be linked to show how the actual data compares with what was forecast. Model-to-model associations also can be used to link models at different levels of an enterprise as described with reference to FIG. 2. For example, a local office may have a forecasting model to which a regional office forecasting model may be linked to facilitate regional forecasting.

Eighth, forms and reports also are manifested in metadata, allowing for the metadata-based adaptation of the input and output data structures to be used by a metadata-based application. The forms and reports metadata is illustrative of an advantage of the use of metadata: because the application is described by metadata, rather than by hard code, changes to the types in the type library or changes to structural metadata or calculations metadata automatically cascade to effect changes to the forms and reports based on the type library or structural metadata. If the application, or any of these constituent portions were hard-coded, they would have to be rewritten to conform to changes made in other aspects of the application. Alternatively, the metadata may be adapted to prevent changes in the type library or structural metadata from being cascaded. Hypothetically, a change in a type library or other metadata may cause a report or a form to no longer be able to operate validly. Thus, the option to prevent changes in the metadata may beneficially prevent the cascade of an undesirable change in underlying components of the application. In any case, by defining all these application attributes in metadata, the changes in one type of metadata can be incorporated into other forms of metadata without writing new code to support the changes in the application attributes.

Finally, miscellaneous system configuration metadata is used to describe the deployment of applications in physical form, as described in the following sections.

Translation of Metadata-Based Description of Application into Physical Form

Implementations of the metadata-based system translate the taxonomy 400 (FIG. 4) into a physical form according to a series of rules. The translation from the metadata not only facilitates a physical implementation of a metadata-based application, but also manipulates available physical components to augment the function available in the standard, physical components.

It should be noted that the metadata used to describe the application is not tied to any particular physical form. One of the advantages of implementations of the metadata-based application deployment is freeing users from having to hard-code applications, which would involve the users having to have knowledge of specific physical implementations in order to create code to manage the physical implementation.

Instead, the metadata describes the functionality of the application that could be manifested in a plurality of different physical implementations. Nonetheless, having a baseline set of rules for translating the application manifested in the metadata to a physical implementation provides a relatively simple, standardized process for deploying the application from the metadata.

For example, FIG. 5 illustrates an implementation of translation of structural metadata 402 describing the application 410 into a physical implementation 500 of those structures. The structural metadata 402 is comparable to the metadata 400 of FIG. 4. However, for purposes of depicting the manifestation of the structure, the calculation rules 480 are omitted from FIG. 5.

In one implementation, the application 410 is translated into a physical structural implementation 500 by the application of a standard set of translation rules. First, the contents of the application 410 are stored in a relational database 510. The relational database 510, in one implementation, is a structured query language (SQL) database, such as can be managed by SQL Server offered by Microsoft Corporation of Redmond, Wash. The dimensions 450 and the data models 460 of the root model site 430 of the application 410 are represented in the relational database 510 as a plurality of tables 520 and 530, respectively. In one implementation, each of the dimensions 450 and each of the data models 460 is represented in the relational database 510 by one of the corresponding tables 520 and 530, again respectively.

Also in one implementation, foreign key links 535 may join the table or tables 520 corresponding with the dimensions 520 to the table or tables corresponding with the models 530. In such an implementation, a column in the fact table of the table or tables representing the model 530 includes a column including an identifier of the dimension associated with the model at that point. The identifier, in one implementation, is an integer identifier. As will be appreciated by one skilled in the art, using an integer identifier is much faster than, for example, using a string. Thus, by including a metadata-to-physical translation rule that specifies the use of integer identifiers to link the tables 520 and 530, the tables 520 and 530 can be linked efficiently.

Second, according to another translation rule, the contents of the root model site 430 are stored in a multidimensional database 540. The multidimensional database 540, in one implementation, is an Analysis Services (AS) database, such as can be managed by Analysis Services, also offered by Microsoft Corporation. In the multidimensional database 550, the dimensions 450 of the root model site 430 (stored as tables in the relational database 510) are also stored as dimensions in the multidimensional database 540. The data models 460, also stored as a plurality of tables 530 in the relational database 510, are stored in as a multidimensional structure 560, such as a data cube, in the multidimensional database 540. The dimensions 550 and the multidimensional data structure 560 are joined by links or keys 565 to associate desired dimensions 550 with appropriate entries of the multidimensional structure 560.

Based on this implementation of a set of translation rules, once the application 410 is described in metadata according to a taxonomy including the root model site 430 and its dimensions 450 and data models 460, the application 410 can be translated into an operational or physical implementation 500. Each of the components described in the metadata 400 maps to one or more physical components in the physical implementation 500, allowing for automatic deployment of the metadata-based application 410.

The implementation of the translation and deployment of the application provides a number of advantages to its users. One advantage, as previously described, is that the deployment of the application is driven by metadata, without the user having to create hard code. In addition, implementations of metadata-based application deployment are not only more accessible to a range of users, but also enhance the functionality available in the resulting application.

To take one example, implementations of metadata-based application deployment allow for the creation of parent-child hierarchies. Multidimensional data structures, such as an Analysis Services data cube, only provide a single level of parent-child hierarchy per dimension. For example, a local office can be a child of a regional office, but the data cube does not further provide for the hierarchical association of individual persons or groups to be associated with the local offices and then associated with the appropriate regional office. However, implementations of metadata-based application deployment allow for parent-child hierarchies that include more than a single parent-child linkage.

It is logical for a user or enterprise to desire to have multiple parent-child hierarchies. In an implementation of metadata-based application deployment, a potentially unlimited number of parent-child hierarchies can be established within a dimension. To implement these multiple hierarchies, multiple dimension tables 520 are created in the relational database 510, in which the tables 520 correlate the identifier of each child with each parent. Specifically, one table may be created for each desired parent-child hierarchy. Then, in the dimensions 550 created in the multidimensional database, separate dimensions are created for each of the parent-child hierarchies. The dimensions within the multiple-level parent-child hierarchy can thus be linked.

Thus, in the example of a hierarchy in which individuals are associated with a local office and, in turn, with a regional office, this multiple-level hierarchy can be supported within the multidimensional database 540. A dimension 550 correlating the regional office to the local offices associated with the regional office is linked to another dimension 550 linking the local offices to the individuals associated with the local office. The dimension associating the individuals with the local office is, in turn, linked to the multidimensional data structure 560. As a result, as may be defined in metadata, the application can specify a regional office and, through the linked dimensions, track the multiple-level hierarchy through to the individuals associated with the regional offices through their respective local offices.

Figure 6:
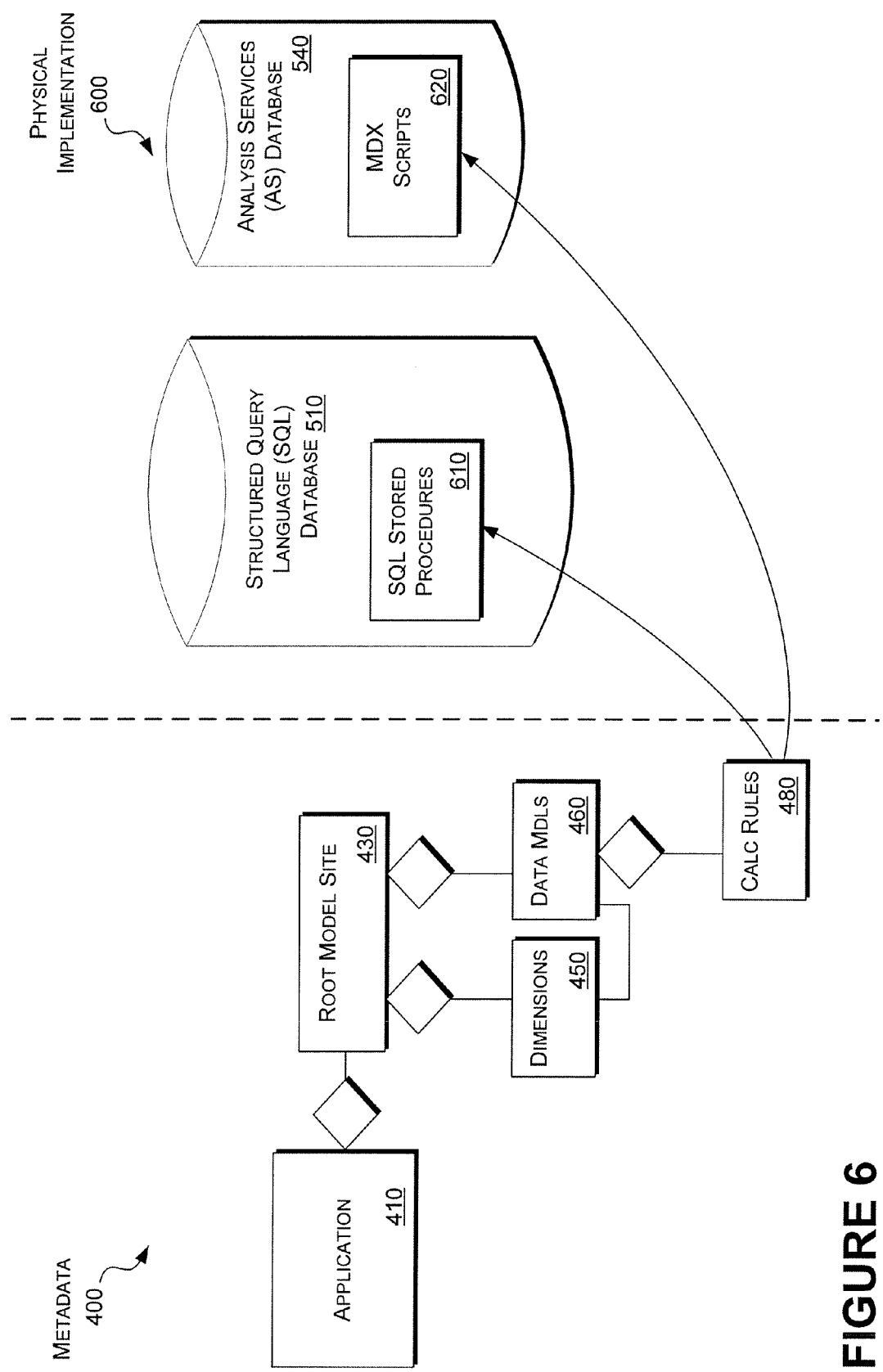

FIG. 6 illustrates an implementation of translation of the metadata 400 describing the application 410 into a physical implementation 600 focusing on the translation of the calculation rules 480. In FIG. 6, the calculation rules 480 are included as an attribute of the data models 460 as previously described with reference to FIG. 4.

The calculation rules 480 included in the metadata 400 are appropriately translated into variety of physical forms. In one implementation, consistent with the fact that the application 410 and the corresponding relational database 510 is the receptacle of all the metadata and represented structure and functions, the calculation rules 480 for the application are translated into one or more procedures 610. In the implementation shown in FIG. 6, the relational database 510 storing the application 410 is a SQL database, accordingly, the calculation rules 480 are translated into one or more SQL stored procedures 610. In terms of the root model site 430 represented in the multidimensional database 540, the calculation rules 480 are translated into scripts 620 for manipulating the multidimensional database 620. Specifically, because the multidimensional database 540 includes an Analysis Services database, the scripts 620 include one or more multidimensional expression (MDX) scripts.

The foregoing examples of physical implementations of the calculation rules are for illustration, not limitation. The calculation rules 480, like the other metadata describing structures and other facets of the application, can be translated into any number of desirable forms. For example, the dimensions 450 and data models 460 may be appropriately translated into a spreadsheet or a series of pivot tables managed by Microsoft Excel provided by Microsoft Corporation of Redmond Wash. Correspondingly, the calculation rules 480 would be translated into spreadsheet formulas for performing operations on the data stored in the spreadsheet. In addition, the calculation rules 480 could be translated into hard code for performing a desired procedure that is not available in another vehicle or better implemented as hard code.

System for Deploying Metadata-Based Applications

Figure 7:
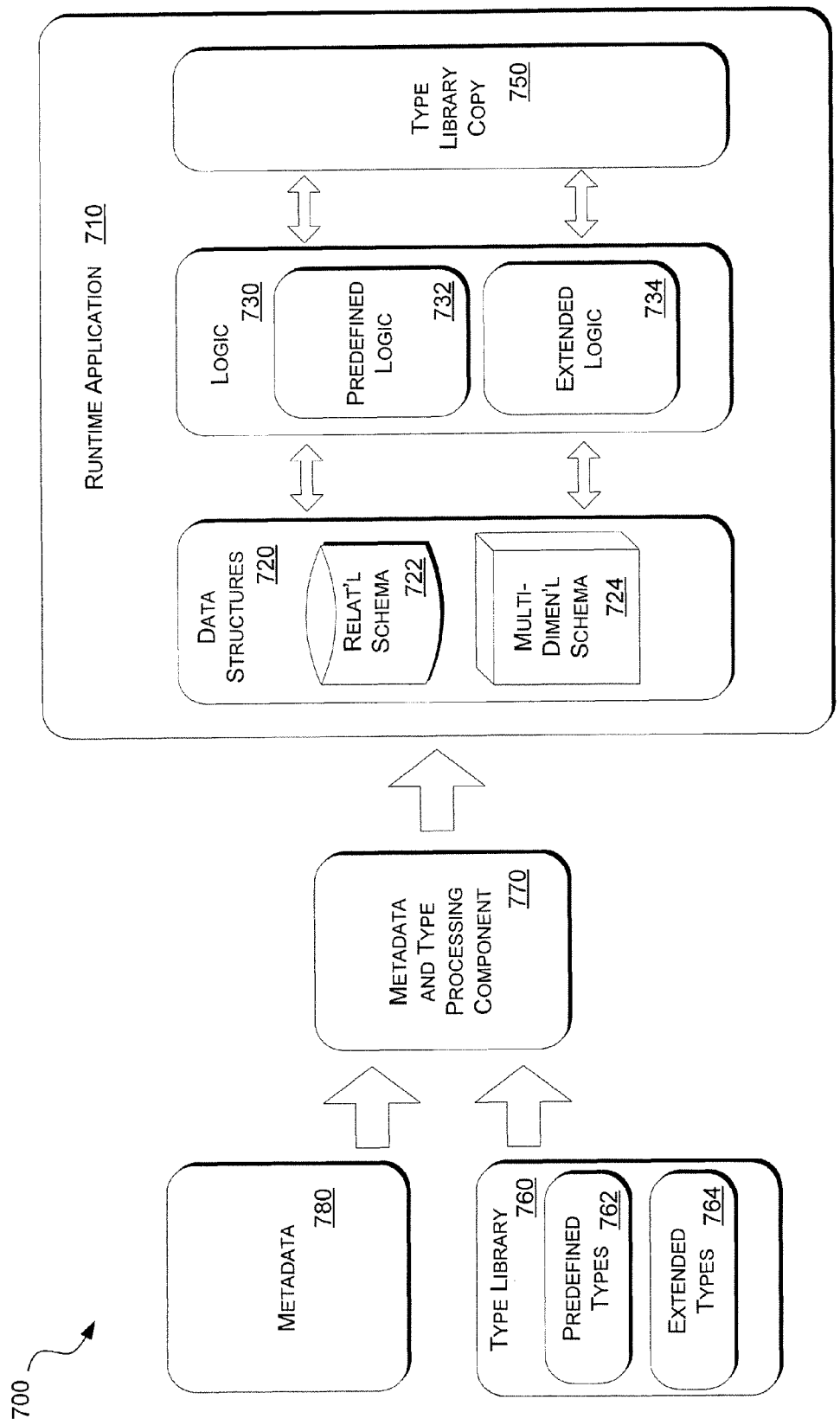
FIG. 7 is a block diagram for of a system for generating a runtime application according to an implementation of metadata-based application deployment.

FIG. 7 illustrates an implementation of a system 700 for generating a runtime application 710 using metadata-based deployment. Generally, the runtime application 710 is generated from a type library 760 that is modified by a metadata and type processing component 770 using metadata 780. The type library 760, which was previously explained with reference to FIG. 3, includes previously developed components of an application that can be modified by the application of the metadata 780 that is based on the types selected from the type library 760.

In one implementation, the type library 760 may include types relating to business processes, financial models, and other core areas that are of interest to a plurality of organizations. The types can be modified or tailored to suit a particular environment, allowing for the generation of customized applications without having to hard-code the structures, calculations, or other desired application attributes. The technical details inherent in the provision of the structures and other attributes need not be understood by the user, and the user does not have to know how to code the attributes. Instead, the user can select desirable attributes and use metadata to customize each of the selected attributes.

The type library 760 of FIG. 7 suitably includes two different types of predefined types: predefined types 762 and extended types 764. In one implementation, predefined types 762 include types developed by the provider of the metadata-based application deployment system 700. For example, the predefined types 762 may include data structures suited for common financial reporting, as well as standard business and financial calculations. The predefined types 762 include attributes that may be desired by different organizations and adapted to suit particular application needs or objectives.

In addition, one implementation of a type library 760 provides for the inclusion of extended types 764. The extended types 764 may include an application attribute not included in the predefined types 762 or an adaptation based on one of the predefined types 762 that the organization would like to make available for use in generating future applications. The extended types 762 may include specialized types, such as data structures for an industry-specific type of financial tracking and reporting or specialized types of calculations used in a particular type of financial enterprise. The extended types 764 also may include pre-developed types that a user of the metadata-based application deployment system 700 can acquire from another organization as well as additional types the organization may create for itself. By allowing for the inclusion of the extended types 764, an organization can add to the attributes available for use in generating applications.

To adapt selected types from the type library 760, which provide a set of function-rich pre-developed, encapsulated structures and behaviors from which the runtime application 710 can be created, the metadata 780 allows a user to tailor or otherwise adapt the types to suit the user's environment and objective. As previously described, the types may define data structures or calculations for year-end reporting, but those types desirably are adapted for the organization for which the report is created. For example, different organizations will have different numbers of business units or subsidiaries on which to report, and the report type should be tailored to conform to the nature of each of the organizations seeking to adapt that type to create an appropriate runtime application 710. The metadata 780 includes the parameters to be applied to the types to generate the customized runtime application 710.

In one implementation of the system 700 suited for business applications, the metadata 780 is created and collected by a business modeler. The business modeler, for example, may include a type library 760 interface allowing the user to select and adapt types suited for the application the user seeks to create. The business modeler assists the user in navigating through the taxonomy of the metadata to create metadata that defines the application. The business modeler also suitably includes a user interface to engage the user in working with the types to adapt the selected type to incorporate dimensions and members appropriate for the user's organization.

In the case of structure types, the business modeler will elicit from the user information precisely what dimensions and members should be included in the data structures for the application. This customizing information is collected in the metadata 780 used in generating the runtime application 710. Similarly, for calculation types, the business modeler elicits which fields will be used in performing which calculations, what standard multipliers or discount factors the organization might use, etc., to adapt calculation types to suit the organization. This customizing information also is captured in the metadata 280.

Once information for adapting and configuring the appropriate types stored in the type library 760 is collected and encapsulated in the metadata 780, the metadata and type processing component 770 receives the selected types from the type library 760 and applies the metadata 780 to the selected types to generate the runtime application 710. The processing component 770 includes appropriate logic to, based on the selected types from the type library 760 and the metadata 780, generate appropriate data structures and logic to support the implementation and operation of the runtime application 710 as further described below.

The processing component 770 is configured to perform validation to ensure the integrity of the runtime application 710. An advantage of developing the runtime application 710 from a plurality of types included in a type library is that, because the types are known, many attributes of each of the types can be assumed. As a result, the processing component 770 is equipped with a great deal of information about the different types and can thus validate the metadata. For example, if a user selects a consolidation type from among a group of financial calculation types, there is a certain minimum dimensionality that the processing component 770 can verify. In the example of a consolidation type, the processing component 770 will expect a time dimension, a scenario dimension, and other dimensions. If the user manipulates the type to eliminate the minimum dimensions, the processing component 770 will identify the problems and give the user a chance to correct the metadata 780.

It should be noted that, instead of the processing component 770 performing the validation, the business modeler or other user interface that is used to create the metadata also may be configured to verify the metadata 780. Thus, while the user creates the metadata 780, the interface can monitor the metadata 780 to ensure that the runtime application 710 includes the minimum dimensionality and adhere to other standards applicable to the types in the type library that are selected for the application. If these minimums or rules are not honored, the interface can, at the point of metadata creation, direct the user to change the metadata 780 so that it adheres to appropriate standards.

Although the processing component 770 or another component may be configured to validate the metadata 780, the validation will not prevent users from extending the types to create the runtime application 710. For example, although a certain minimum dimensionality might be required for a particular application type, additional dimensionality or granularity may be added without violating the rules for the selected type. For example, an account reconciliation type may expect a minimum dimensionality in terms of revenue, cost, and profit dimensions collected over time. Generally, the time dimension may include members of months; however, if a user wishes to extend the type to reconcile the accounts on a weekly basis, the system 700 will permit this. The metadata validation will allow greater dimensionality or more granular definitions of dimensions, as long as minimum standards or assumptions associated with the types are met.

Similarly, implementations of a metadata-based application deployment system 700 can validate not only the metadata 780, but also the data used in the runtime application 710. For example, if the runtime application 710 includes a time dimension, the data entered is validated to determine if, in fact, the data entered is consistent with a time dimension and is not a series of dollar figures, customer names, or other data that is not consistent with the specified type. Thus, the use of types from a type library 760 allows validation for metadata 780 to be applied to the types and/or the data entered in data structures associated with specified types.

According to implementations of metadata-based application deployment, the runtime application 710 is generated according to the previously described taxonomy. By adhering to the taxonomy, the runtime application 710 will be scalable and adaptable to facilitate deployment at different locations and at different levels of the organization. In one implementation as depicted in FIG. 7, the runtime application includes data storage 720, logic 730, and a type library copy 750 to provide the components needed for operation of the application.

In one implementation, according to the previously described taxonomy, the data structures 720 include a relational schema 722 and one or more multidimensional schema 724. The relational schema 722 defines a repository for storing the runtime artifacts of the metadata, which includes the portions of the metadata that direct the operation of the runtime application 710. The relational schema 722 also defines a relational database that serves as a master repository for the data used in the application, as previously described.

The data structures 720 also include one or more multidimensional data schema 724 that define one or more data cubes or other multidimensional data structures. The data structures defined by the multidimensional schema 724 receive and manipulate application data to provide the analysis and reporting performed by the application. As previously described, each deployment of the runtime application 710 includes one or more multidimensional data structures to provide data storage and facilitate the analysis, and reporting features provided by the runtime application 710.

With the data structures 720 implemented by the processing component 770 according to the type library 760 and the metadata 780, logic 730 is generated to manipulate the data that will be stored in the data structures 720. The logic 730 includes two different types of logic: predefined logic 732 and extended logic 734, corresponding with the two classes of types included in the type library 760, the predefined types 762 and the extended types 764. The predefined logic 732 includes the calculations and other control logic derived from the predefined types 762. By selecting data structures, calculations, and other components from among the predefined types 762, the logic to be used in processing the data stored in the data structures is already developed; it merely has to be adapted—using the metadata 780—to specify how the logic is applied to the data.

In particular, using the predefined types 762, data structures and predefined logic 732 are deployed in the runtime application 710 according to the parameters applied by the metadata 780. Corresponding, for the extended types 764 created by the user, the user's organization, or third parties, the extended logic 734 is extracted from the type library 760 and customized by the metadata 780 to process information according to the extended types 764. that is encapsulated in the extended types 764 also is tailored to provide the using one or more of the predefined types 762, the extended logic 734 includes the logic derived from the extended types 764.

By adhering to the taxonomy and by developing the metadata 780 based on types in the type library 760, the logic 730 needed to process data stored in the data structures 720 already exists to generate, for example, appropriate year-end financial calculations for the data stored in the data structures. The logic only needs to be customized to the parameters of the desired runtime application 710 as specified in the metadata 780. In other words, the data structures 720 provide for storage of application data and the logic 730 provides the programming to operate on that data without the user having to perform any programming or create any code.

In one implementation, the runtime application 710 also includes a type library copy 750 that is accessible to the logic 730. As previously described, it is desirable to avoid having to include any hard coding in the runtime application 710. Accordingly, if an enhancement is made or desired to one of the predefined types 762 or extended types 764, it is desirable to include that enhancement in the runtime application 710. Instead of the enhancement needing to be hard-coded in the runtime application 710, the enhancement is made to one or more of the types in the type library 760. By including a copy of the type library 750 in the runtime application 710, that enhancement is included in the runtime application 710 without hard coding. In addition, by including the enhancement in the runtime application 710, the enhancement is made available in further deployments of the runtime application 710 without any hard coding in the further deployments.

In sum, the architecture embodied in the metadata-based application deployment system 700 allows for runtime applications 710 to be created without hard coding. As a result, it is easier to generate and customize runtime applications 710. This ease of use allows for business users, rather than programmers, to generate and customize runtime applications 710.

It should be noted that, even adhering to the previously described taxonomy, implementations of metadata-based application deployment are not limited to the generation of any particular types of data structures or logic. For example, when the nature of a runtime application does not require a multidimensional data structure, relational databases may be generated to support the operations of the application. For another example, instead of using metadata to adapt pre-defined logic or extend logic, a processing component may generate code to implement logic needed to perform various functions. Metadata-based application deployment is directed generally toward enabling the creation, customization, and deployment of applications without the user having to hard-code the application. Implementations of the metadata-based deployment system are not limited to particular schemas or logic in fulfilling that objective.

It should also be noted that metadata-based application deployment is distinct from simply modifying a template. For example, a spreadsheet application can be taken as an example of a simple, tabular database management program. Many off-the-shelf spreadsheet applications include templates for spreadsheet-based financial or mathematical applications ranging from loan amortization to statistical functions. While a template-based approach provides a user with a basis to build a customized application, it is different from a metadata-based approach in several respects. For one example, to build an application based on a template, a user must understand how to edit and modify the spreadsheet formulas; in other words, the user has to be able to create spreadsheet code to generate the application he or she desires. In addition, a template-based approach restricts the user to the particular data structure provided by the template, whereas in implementations of metadata-based application deployment can generate schemas to define different types of data structures.

In other words, a template provides a user with a set of code that a user can edit to tailor to suit the user's needs, but the user still has to revise the code to suit his needs. To deploy that application in another context, the code would have to be modified again. By contrast, in metadata-based application deployment, the user identifies in metadata the information and reports that are desired, and the type library and processing components describe the data structures and logic to provide the application without the user creating or revising code. In deploying that application in another context, a user may change the metadata to adapt the application for that context, but the user need not create or revise any code to accomplish that purpose.

Implementations of Deploying Metadata-Based Applications

Figure 8:
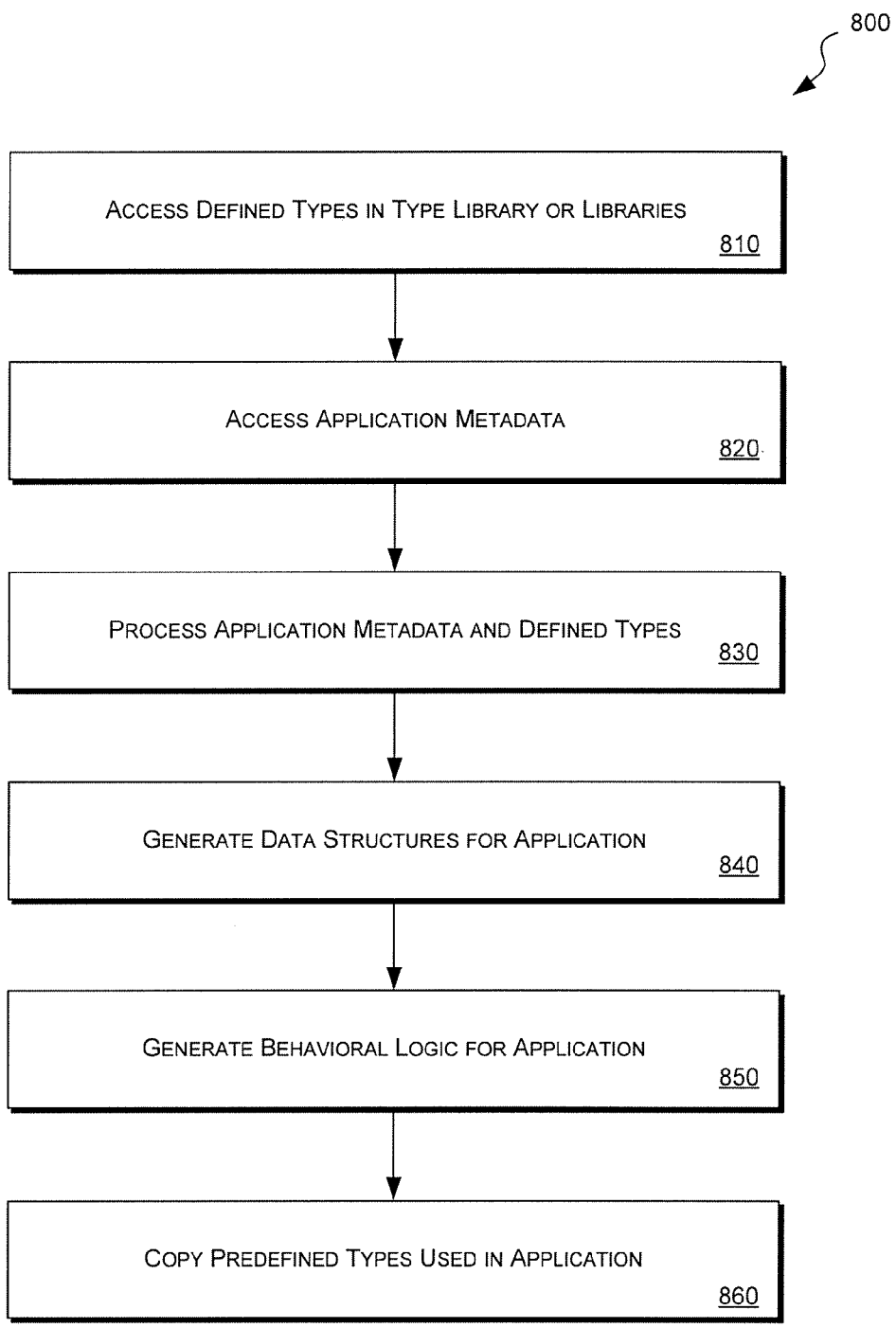
FIG. 8 is a flow diagram of a process of an implementation for generating an application from metadata.
Figure 9:
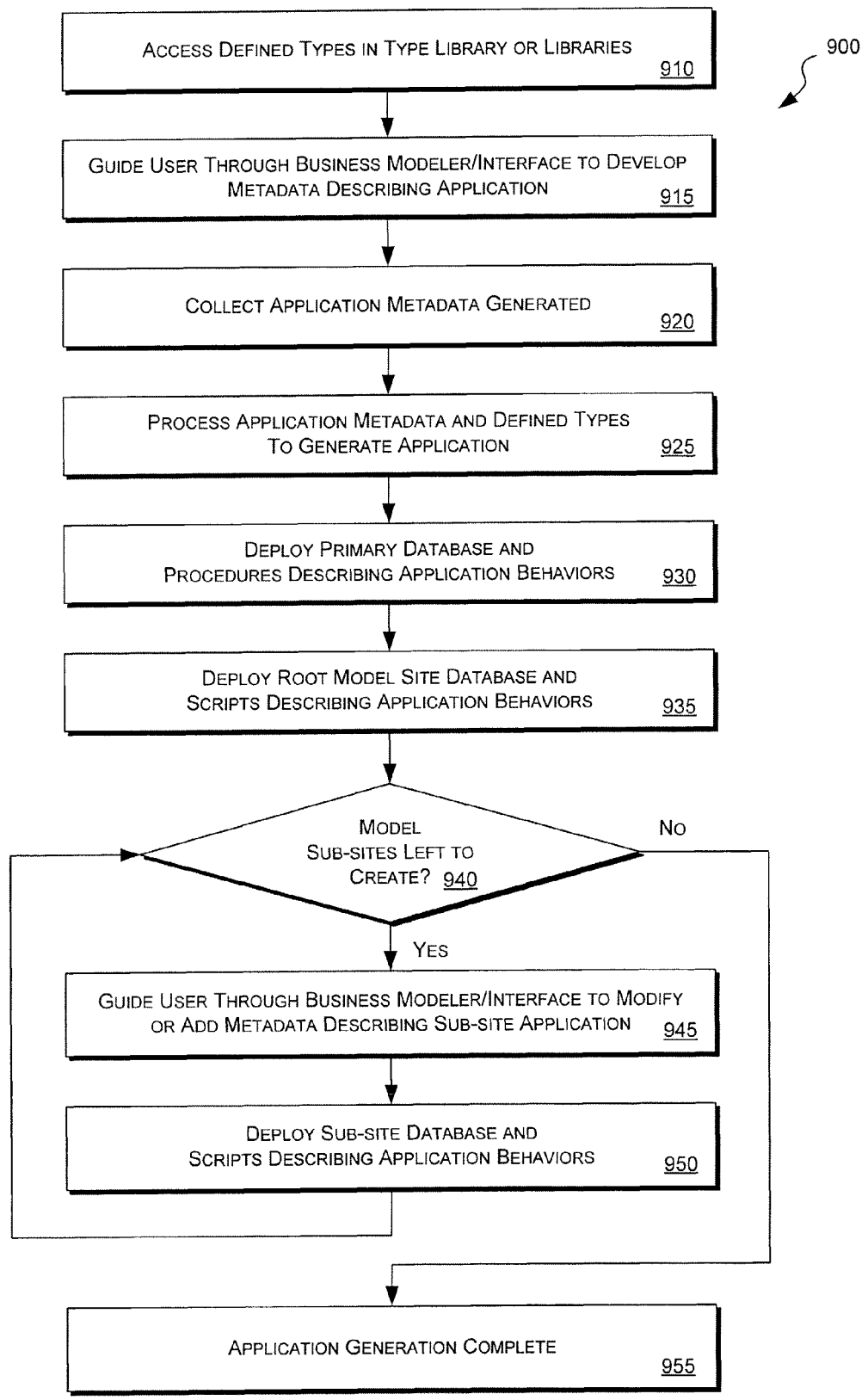
FIG. 9 is a flow diagram of creating an application using metadata then using the metadata to deploy the application.

FIGS. 8 and 9 are flow diagrams illustrating implementations of deploying metadata-based applications. The implementations of FIG. 8 and FIG. 9 are intended to illustrate, not limit, implementations of metadata-based application deployment.

FIG. 8 shows a flow diagram 800 illustrating a process by which a metadata-based application is deployed. At 810, defined types stored in a type library or libraries are accessed. As previously described with reference to FIG. 7, predefined types 762 and/or extended types 764 drawn from a type library 760 are the basic components from which a run-time application 710 is created. At 820, to adapt the components drawn from the type library 760 as desired, application metadata is also accessed. At 830, the defined types identified for use in the application and the metadata are processed. As previously described, it is the metadata customizing the defined types that is used to create the application without the user having to write of code.

At 840, the data structures for the application are generated. As previously described with reference to FIG. 7, the defined types include data structure types that are tailorable through the use of metadata to create structures appropriate for the application. In one implementation of metadata-based application deployment, as previously described with reference to FIG. 5, the data structures are generated according to established rules that simplify the process of application generation. Accordingly, for the overall application, an SQL database is created as a receptacle to receive all the parameters defining the application. In addition, for the root model site, a multidimensional database, such as an Analysis Services database is created. For each subsite, an additional Analysis Services database also is created. As previously described, each of these databases is linked to appropriate tables, dimensions, and/or other data structures to manifest data structures appropriate for the application and each of the application sites.

At 850, behavioral logic for the application is generated. Again, as described with reference to FIG. 7, the type library 760 includes financial behavior types and/or other behavior types that provide a basis for imposing behavioral logic on the data stored in the data structures created for the application. As shown in FIG. 6, a set of stored procedures, such as SQL stored procedures 610 are created for the application from calculation rules 480 by applying metadata to predefined types drawn from the type library. For the root models site or other subsites, in one implementation, the calculation rules are created as one or more MDX scripts that are generated by applying metadata to predefined types drawn from the type library.

At 860, as shown in FIG. 7, the predefined types stored in the type library—or at least as many types as are selected for use in the application—are copied to a location accessible by the runtime application 710. thus, as illustrated in FIG. 7, a run-time application 710 is created from a plurality of predefined types stored in a typed library 760 that a user can adapt to create a tailored application using metadata 780 rather than manually defining data structures and/or behaviors through the time- and labor-intensive of creating a hard code to define the same.

FIG. 9 illustrates a flow diagram 900 of another implementation of a process for metadata-based application deployment. The flow diagram 900 describes deployment of a root model site and, optionally, one or more subsites.

At 910, one or more defined types stored in a type library or libraries are accessed. At 915, with knowledge of the available types stored in the type library, a user is guided through a business model or other interface to prompt the user for parameters to modify the types to create a desired application. The result of this process is the metadata that, once applied to the selected types, will specify the desired application. At 920, the application metadata generated through the interchange with the user is collected.

At 925, the application metadata applied to the selected types to process the metadata and types to process the application. At 930, a primary database manifesting the data structures and procedures manifesting the application behaviors are deployed. Again, as previously described in one implementation, deployment rules dictate that this database is a relational database, such as an SQL database, and the behaviors are represented by stored procedures. At 935, a root model site manifesting the data structures and scripts manifesting the application behavior is deployed. In one implementation, deployment rules dictate the database is a multidimensional data structure, such as an Analysis Services cube, and the behaviors are represented by scripts, such as multidimensional expression (MDX) scripts.

At 940, it is determined if there are any subsites to be generated. As previously described, the subsites are patterned after the root model site. At 945, a user is guided through a business modeler or other interface to modify or add metadata to develop or tailor the subsite application. At 950, the subsite manifesting the data structures and scripts manifesting the application behavior is deployed. In one implementation, deployment rules dictate the subs-site database is a multidimensional data structure, such as an Analysis Services cube, and the behaviors are represented by scripts, such as multidimensional expression (MDX) scripts. Once the subsite has been created, the flow diagram 900 loops to 940 to determine if there is another subsite to be deployed.

If, at 940, is determined that there are no subsites left to create (either because no subsites are to be created or any desired subsites already have been created), the flow diagram 900 advances to 955. At 955, the application generation is complete, including the application, the root model site, and any desired subsites. Although not shown in FIG. 9, if it is desired to modify the root model site and/or any subsites, or if subsites are to be added, the business modeler or other interface can be engaged to modify the sites or add subsites.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for representing a computer-executable application, comprising:
   accessing one or more type libraries including defined object types configurable for use in generating the application, the defined object types including:
      one or more data structure types;
      one or more rule types; and
      one or more data types; and
   generating application metadata to adapt the defined object types to generate the application, the metadata being generated to:
      adapt the one or more defined data structure types to create one or more application databases, the applications databases including:
         a relational database to receive the application data; and
         at least one model database in communication with the relational database and configured to receive data from the relational database to perform runtime reporting operations for the application;
      adapt the one or more defined rule types to create one or more application behaviors; and
      adapt the one or more defined data types to create one or more application data types.

2. The computer-implemented method of claim 1, wherein the type libraries include:
   one or more predefined type libraries including a plurality of generalized predefined types; and
   one or more extended type libraries, each of the extended type libraries including one or more extended types that have been one of created and adapted from one of the generalized types for use with a type of business.

3. The computer-implemented method of claim 1, further comprising collected the metadata generated into a set of application metadata such that the set of application metadata and the one or more type libraries are configured to be processed for generating the application.

4. The computer-implemented method of claim 3, wherein the generating of the application includes:
   generating the application behaviors; and
   applying the application behaviors to the application databases to provide functionality of the application.

5. The computer-implemented method of claim 4, further comprising:
   creating a type library copy of at least a portion of the one or more type libraries; and
   applying the application behaviors to the type library copy, wherein the application behaviors are implemented by adapting types stored in the type library copy.

6. The computer-implemented method of claim 5, wherein the eliciting of user input is performed via an interface configured to:
   allow a user to select from one or more lists identifying the plurality of defined object types;
   allow the user to specify dimensions of data to be available to the application; and
   allow the user to specify at least one model in which the data will be stored.

7. The computer-implemented method of claim 4, wherein the generating of the application further comprises generating a root model site including:
   a root model database including the dimensions specified by the user and the at least one root model in which the data will be stored; and
   a root model set of application behaviors.

8. The computer-implemented method of claim 7, wherein the generating of the application further comprises generating at least one application subsite derived from the root model site, the application subsite including:
   a subsite database including the dimensions specified by the user and the at least one subsite model in which the data will be stored; and
   a subsite set of application behaviors.

9. The computer-implemented method of claim 8, further comprising restricting access to the subsite database, wherein the restricting of the access includes one of:
   complete access restriction of the subsite database to one or more authorized subsite users such that other users of the root model site are prevented from accessing content of the subsite database; and
   partial access restriction of the subsite database such that other sites are prevented from accessing the content of the subsite database except for designated summary data.

10. The computer-implemented method of claim 1, further comprising validating the application metadata to ensure validity of the application behaviors relative to the one or more application databases.

11. A computer-readable memory operable for storing computer-readable data defining a metadata-based application, comprising:
   a type library access module operable to access one or more type libraries including a plurality of defined object types configurable for use in generating the application;
   a metadata access module operable to access a set of application metadata configured to adapt the defined object types to generate the application; and
   a metadata processing module in communication with the type library access module and the metadata access module and an application destination, the metadata processing module being configured to apply the application metadata to the plurality of defined object types to generate the application, including:
      adapting one or more defined data structure types, including:
         creating one or more application databases for storing application data; and creating one or more multidimensional databases configured to access the one or more application databases and to facilitate reporting of the application data;

adapting one or more defined rule types, including:

causing at least a portion of the one or more type libraries including the plurality of predefined object types to be copied to the application destination; and creating one or more application behaviors configured to adapt the plurality of predefined object types to provide the intended functioning of the application.

12. The computer-readable memory of claim 11, further comprising a metadata creation module, including:

an object interface configured to allow a user to select application objects to be included in the application and generate object metadata;

a dimension selector configured to allow the user to specify dimensions of data to be available to the application;

a model selector configured to allow the user to specify at least one model in which the data will be stored; and a metadata collector configured to receive the metadata defining the application.

13. The computer-readable memory of claim 11, wherein the one or more type libraries include an extended type library including one or more extended types created for use with one of a particular use and a particular industry.

14. The computer-readable memory of claim 13, wherein the one or more application behaviors include one or more extended behaviors created by applying the application metadata to one or more extended types of the extended type library.

15. The computer-readable memory of claim 11, wherein the metadata processing module is further configured to generate a root model for the application, the root model including:

a root model database including the dimensions specified by the user and the at least one root model in which the data will be stored; and a root model set of application behaviors.

16. The computer-readable memory of claim 15, wherein the metadata processing module is further configured to generate a model subsite for the application derived from the root model site, the model subsite including:

a subsite database including the dimensions specified by the user and the at least one subsite model in which the data will be stored; and a subsite set of application behaviors.

17. An application taxonomy system for a metadata-generated application, the application comprising:

an application database configured to store data used by the application deployed at each of a plurality of sites, the application database being defined by a defined database type adapted by database metadata to support a user-defined application;

a root model site including:

a set of root model application behaviors, the application behaviors being defined by one or more predefined behavior types adapted by behavior metadata to support the user-defined application; and a root model database including a root data model and root model dimensions defined by at least one predefined database type adapted by database metadata configured to support the root model application behaviors; and at least one model subsite configured to provide a runtime application, the model subsites including:

a set of subsite application behaviors adapted from the root model application behaviors to support desired functions of the model subsite;

a subsite database including a subsite data model and subsite model dimensions adapted from the root model database and configured to support the subsite application behaviors.

18. The system of claim 17, wherein the application database is a relational database.

19. The system of claim 18, wherein the root model database and the subsite database each include a multidimensional database, contents of each multidimensional database being extracted from the application database.

20. The system of claim 17, further comprising one or more copies of a type library deployed with the application, the type library including:

a plurality of predefined behavior types; and a plurality of predefined database types.

* * * * *